United States Patent
Roberts et al.

(10) Patent No.: US 8,732,275 B2
(45) Date of Patent: May 20, 2014

(54) METHODS AND SYSTEMS FOR DELIVERING A PERSONALIZED VERSION OF AN EXECUTABLE APPLICATION TO A SECONDARY ACCESS DEVICE ASSOCIATED WITH A USER

(75) Inventors: Brian F. Roberts, Dallas, TX (US); Anthony M. Lemus, Irving, TX (US); Japan A. Mehta, Coppell, TX (US); Kishore Tallapaneni, Flower Mound, TX (US); Donald H. Relyea, Dallas, TX (US); Michael R. Oliver, Hoboken, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 80 days.

(21) Appl. No.: 13/195,839

(22) Filed: Aug. 1, 2011

(65) Prior Publication Data
US 2013/0036200 A1   Feb. 7, 2013

(51) Int. Cl.
*G06F 15/16* (2006.01)
(52) U.S. Cl.
USPC .......................................... 709/219; 725/34
(58) Field of Classification Search
None
See application file for complete search history.

(56) References Cited

U.S. PATENT DOCUMENTS

| | | | |
|---|---|---|---|
| 2005/0188406 A1* | 8/2005 | Gielow et al. | 725/81 |
| 2007/0250863 A1* | 10/2007 | Ferguson | 725/46 |
| 2008/0052624 A1* | 2/2008 | Roberts et al. | 715/716 |
| 2008/0092171 A1* | 4/2008 | Roberts et al. | 725/46 |
| 2008/0109843 A1* | 5/2008 | Ullah | 725/34 |
| 2008/0184117 A1* | 7/2008 | Alsbury et al. | 715/719 |
| 2009/0025024 A1* | 1/2009 | Beser et al. | 725/12 |
| 2009/0133090 A1* | 5/2009 | Busse | 725/132 |
| 2009/0307345 A1* | 12/2009 | Carter et al. | 709/224 |
| 2010/0077017 A1* | 3/2010 | Martinez et al. | 709/201 |
| 2010/0268581 A1* | 10/2010 | Biancardini et al. | 705/14.4 |
| 2011/0145370 A1* | 6/2011 | Nieuwenhuys | 709/219 |

* cited by examiner

*Primary Examiner* — Farid Homayounmehr
*Assistant Examiner* — Maung Lwin

(57) ABSTRACT

An exemplary method includes a media content presentation system 1) delivering a primary media content stream to a primary access device, the primary media content stream comprising data representative of a media content instance that is presented by the primary access device as the primary media content stream is delivered to the primary access device and data representative of an executable application related to the media content instance, 2) determining that a secondary access device associated with a user is located within a detection zone associated with the primary access device during a time period associated with the presentation of the media content instance by the primary access device, and 3) directing the primary access device to generate and deliver a version of the executable application that is personalized for the user to the secondary access device. Corresponding methods and systems are also disclosed.

25 Claims, 12 Drawing Sheets

METHODS AND SYSTEMS FOR DELIVERING A PERSONALIZED VERSION OF AN EXECUTABLE APPLICATION TO A SECONDARY ACCESS DEVICE ASSOCIATED WITH A USER

BACKGROUND INFORMATION

Consumers of media content have an ever increasing number of media content access devices ("access devices") at their disposal. For example, a typical user may experience media content by way of a set-top box device, a mobile device (e.g., a mobile phone or a tablet computer), a personal computer, and/or a variety of other types of access devices.

The availability of multiple access devices may allow a user to concurrently interact with different types of content being presented by way of more than one access device. For example, a user may desire to experience (e.g., watch) a television program being presented by way of a set-top box device and at the same time interact with a mobile application (e.g., a mobile phone application) related to the television program. Conventionally, the user has had to manually locate and download the related mobile application before he or she may access it by way of a mobile device. This is inconvenient, time-consuming, and/or difficult to perform for some users.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
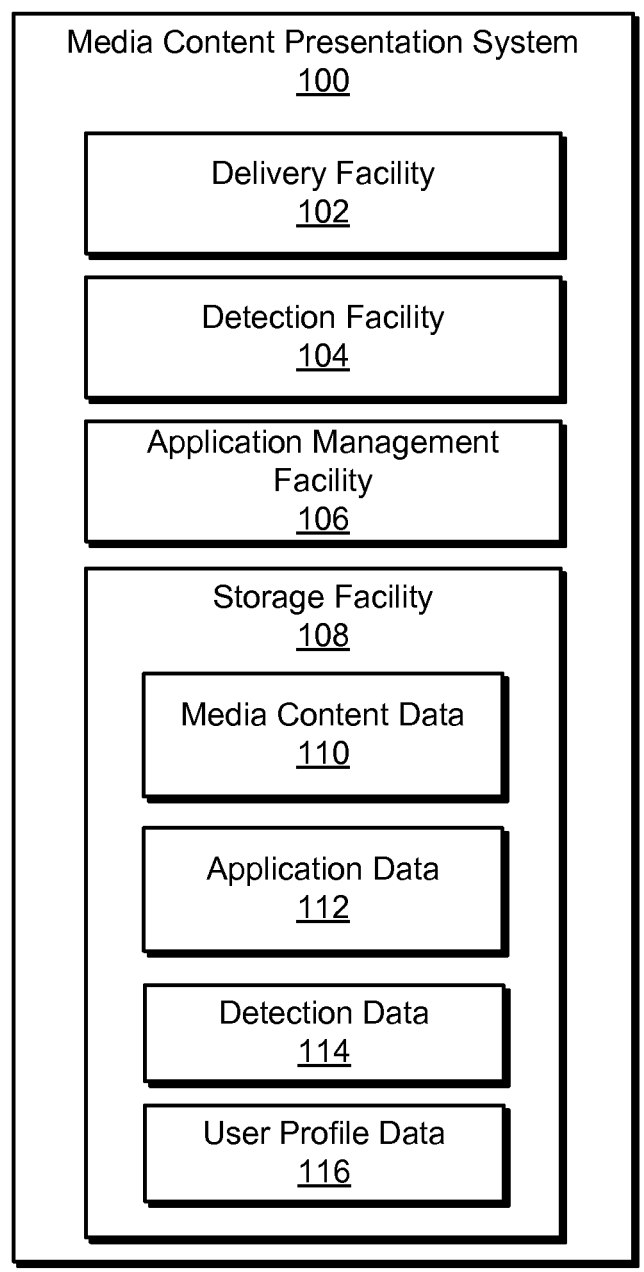
FIG. 1 illustrates an exemplary media content presentation system according to principles described herein.

Methods and systems for delivering a personalized version of an executable application to a secondary access device associated with a user are described herein. As will be described below, in certain embodiments, the methods and systems may facilitate delivery of personalized versions of an executable application to different users that are together watching or otherwise experiencing a media content instance by way of a primary access device (e.g., a set-top box device connected to a television). Each personalized version of the executable application may be related to the media content instance in some way and may be executed by a secondary access device (e.g., a mobile phone or tablet computer) associated with each user. Because the application is personalized for each individual user, the users may each be more apt to pay attention to, interact with, and/or otherwise access the application.

An exemplary implementation of the methods and systems described herein includes a media content presentation system that delivers a primary media content stream to a primary access device (e.g., a set-top box device). As will be described below, the primary media content stream may include data representative of a media content instance that is presented by the primary access device as the primary media content stream is delivered to the primary access device and data representative of an executable application related to the media content instance.

The media content presentation system may be further configured to determine that one or more secondary access devices (e.g., one or more mobile devices) associated with one or more users are located within a detection zone associated with the primary access device (e.g., within the same room as the primary access device) during a time period associated with (e.g., immediately prior to or during) the presentation of the media content instance by the primary access device. In response, the media content presentation system may direct the primary access device to generate and deliver one or more versions of the executable application that are personalized for the one or more users to the one or more secondary access devices for execution by the one or more secondary access devices during the presentation of the media content instance by the primary access device.

To illustrate, a media content presentation system may deliver a media content stream that includes data representative of a television program and a related executable application to a set-top box device. The set-top box device may present the television program as the stream is delivered and buffer or otherwise store the executable application. During the presentation of the television program, the media content presentation system may detect that multiple secondary access devices are located in the same room as the set-top box device and that a different user is associated with (e.g., using) each secondary access device. In response, the media content presentation system may direct the set-top box device to generate and deliver (e.g., transmit) personalized versions of the application to each secondary access device. In this manner, each user may access a unique version of the application during the presentation of the television program.

As mentioned, the data representative of the executable application may be included within the primary media content stream that is delivered to the primary access device. The primary access device may then generate and deliver one or more personalized versions of the executable application to one or more secondary access devices. In-stream delivery of the data representative of the executable application in this manner may obviate the need for a user to manually locate and download the executable application (or a personalized version thereof) directly to his or her secondary access device. In-stream delivery of the data representative of the executable application may additionally conserve network resources (e.g., by obviating the need for a separate out-of-stream communication to transmit the executable application to the primary access device and/or one or more secondary access devices), enhance security (e.g., by obviating the need to establish multiple authenticated communication channels), and/or otherwise be beneficial. In some alternative embodiments, as will be described herein, a server or the like that is separate from the primary access device may generate and deliver the one or more personalized versions of the executable application to the one or more secondary access devices.

As used herein, the term "media content instance" refers to any television program, on-demand media program, pay-per-view media program, broadcast media program (e.g., broadcast television program), multicast media program (e.g., multicast television program), narrowcast media program (e.g., narrowcast video-on-demand program), IPTV media content, advertisement, video, movie, audio content, or any segment, component, or combination of these or other forms of media content that may be processed by an access device for experiencing by a user.

The term "executable application" (or simply "application") refers to any program or application that may be executed by a secondary access device and that may be related to a media content instance presented by way of a primary access device. For example, an application may include a mobile application (e.g., a mobile phone application, a tablet computer application, etc.), a widget, or the like. In some examples, an application may be stored locally by the secondary access device in the form one or more or data files. It will be recognized that one or more of the data files may be alternatively stored remotely (e.g., by a primary access device and/or a remote server).

A "personalized" version of an application or a "personalized application" refers to an application that has been customized, augmented, and/or otherwise modified for a particular user. For example, different personalized versions of the same application may have different layouts, color schemes, permissions, features, and/or capabilities. For example, different personalized versions of the same application may provide different levels of access to content associated with a media content instance based on an age, a subscription type, and/or any other characteristic of one or more users. In some instances, a personalized version of an application is configured to target (i.e., be configured to appeal to) a particular user. For example, a particular personalized version of an application may be configured to provide one or more features and/or content specifically of interest to the user.

FIG. 1 illustrates an exemplary media content presentation system 100 (or simply "system 100"). As shown, system 100 may include, without limitation, a delivery facility 102, a detection facility 104, an application management facility 106, and a storage facility 108 selectively and communicatively coupled to one another. It will be recognized that although facilities 102-108 are shown to be separate facilities in FIG. 1, any of facilities 102-108 may be combined into fewer facilities, such as into a single facility, or divided into more facilities as may serve a particular implementation.

Delivery facility 102 may be configured to deliver a primary media content stream to a primary access device. The primary media content stream may include data representative of a media content instance that is presented by the primary access device as the primary media content stream is delivered to the primary access device and data representative of an executable application related to the media content instance. Delivery facility 102 may deliver the primary media content stream to the primary access device in any suitable manner. For example, the primary media content stream may be streamed, broadcast, narrowcast, multicast, and/or otherwise transmitted to the primary access device.

The data representative of the executable application may be included in the primary media content stream in any suitable manner as may serve a particular implementation. For example, one or more data files that constitute the executable application itself may be multiplexed into or otherwise included within the primary media content stream (e.g., in the form of one or more data packets). The primary access device may extract the actual application from the primary media content stream and store (e.g., buffer) the application for subsequent processing.

Alternatively, the data representative of the executable application may include a link (e.g., a web or IP address) to a remote computing device (e.g., a remote server) that maintains the executable application. The primary access device may use the link to connect to the remote computing device and download the executable application (i.e., the one or more data files that constitute the executable application) for subsequent processing. The link may be included in the primary media content stream in any suitable manner. For example, the link may be periodically inserted into the primary media content stream as one or more markers. In this manner, the primary access device may detect the presence of the link regardless of when the primary access device begins receiving (e.g., tunes to) the primary media content stream.

In yet another alternative embodiment, the data representative of the executable application may include data representative of a plurality of different versions of the executable application. In this manner, as will be described below, a personalized version of the executable application may be generated for a user by selecting a particular version of the executable application from the plurality of executable applications that is, for example, most relevant to the user.

In some examples, the primary media content stream may not include (at least initially) data representative of an executable application. For example, as will be described below, delivery facility 102 may be entirely implemented by a media content provider subsystem separate from the primary access device (e.g., a server or the like that is remotely connected to the primary access device). In this case, the media content provider subsystem may initially deliver a primary media content stream that includes the media content instance, but that is void of any data representative of an executable application. Once detection facility 104 determines that a secondary access device is located within a detection zone associated with the primary access device (as will be described below), the media content provider subsystem may generate a personalized version of an application for a user of the secondary access device and deliver the personalized version of the application to the secondary access device in any suitable manner. For example, the media content provider subsystem may deliver the personalized version of the executable application to the primary access device by inserting the personalized version of the executable application into the primary media content stream and then direct the primary access device to deliver the personalized version of the executable application to the secondary access device. Alternatively, the media content provider subsystem may deliver the personalized version of the executable application directly to the secondary access device (e.g., by inserting the personalized version of the executable application into a secondary media content stream being delivered to the secondary access device).

Detection facility 104 may be configured to determine that one or more secondary access devices are located within a detection zone associated with the primary access device during a time period associated with the presentation of the media content instance by way of the primary access device. As used herein, a "time period" associated with a presentation of a media content instance by way of a primary access device may include a time period immediately prior to the presentation of the media content instance or a time period during the presentation of the access device. For example, detection facility 104 may determine that a secondary access device is located with a detection zone associated with the primary access device immediately prior to and/or during a presentation of a particular media content instance by way of the primary access device. In this manner, a personalized version of the application included in the primary media content stream may be delivered to the secondary access device for execution by the secondary access device during (e.g., concurrently with) the presentation of the media content instance.

Figure 2:
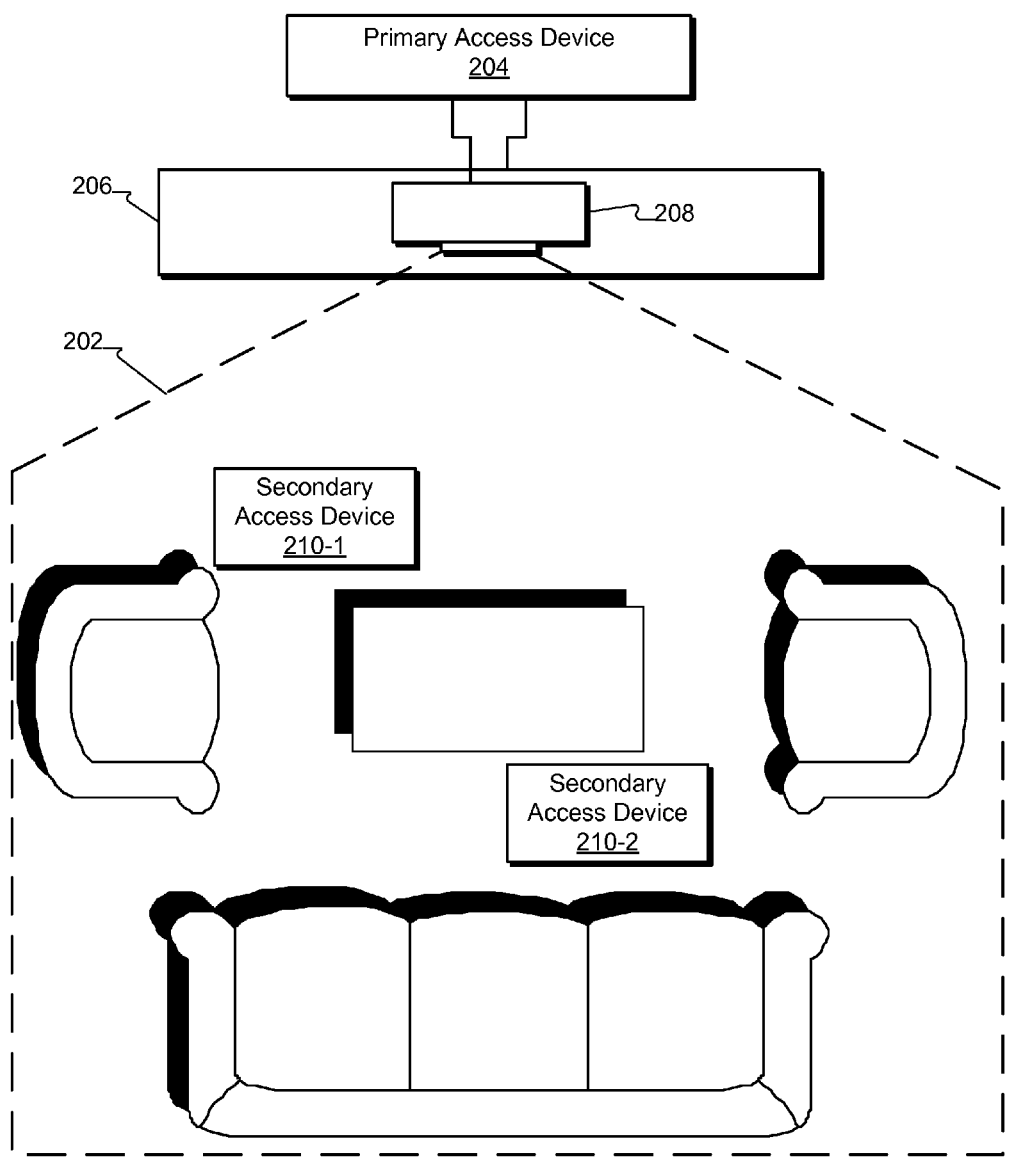
FIG. 2 illustrates an exemplary detection zone associated with a primary access device according to principles described herein.

Detection facility 104 may determine that a particular secondary access device is located within a detection zone associated with the primary access device in any suitable manner. As used herein, a "detection zone" may refer to any suitable physical space, area, and/or range associated with a primary access device. For example, FIG. 2 illustrates an exemplary detection zone 202 associated with a primary access device 204, which may be communicatively coupled to a display screen 206 (e.g., a television) and a detection device 208 that implements detection facility 104. Detection zone 202 may include any suitable space, area, and/or range associated with primary access device 204. To illustrate, detection zone 202 may include at least a portion of a room (e.g., a living room) within a user's home where primary access device 204, display screen 206, and/or detection device 208 are located.

Detection device 206 may include any suitable detection device configured to detect a presence of one or more secondary access devices within detection zone 202. For example, detection device 208 may include an image sensor device, a depth sensor device, and/or an audio sensor device configured to detect whether a secondary access device is located within a predetermined distance of primary access device 204, display device 206, and/or detection device 208. In some examples, detection device 208 may alternatively be integrated with primary access device 204.

To illustrate, FIG. 2 shows two secondary access devices 210 (e.g., secondary access device 210-1 and secondary access device 210-2) that may be associated with different users. Detection device 208 may detect that both secondary access devices 210 are located within detection zone 202 (e.g., by detecting that secondary access devices are both located within a predetermined distance of detection device 208) and thereby determine that the users associated with secondary access devices 210 are also located within detection zone 202. Personalized versions of an application may then be provided to secondary access devices 210, as will be described in more detail below.

A detection zone may additionally or alternatively refer to a footprint of a local area network (e.g., a range of a wireless router that is a part of a wireless local area network). Hence, detection facility 104 may determine that a secondary access device is located within a detection zone associated with the primary access device by detecting that the secondary access device is connected (by way of either a wired or wireless connection) to a local area network of which the primary access device is a part.

Figure 3:
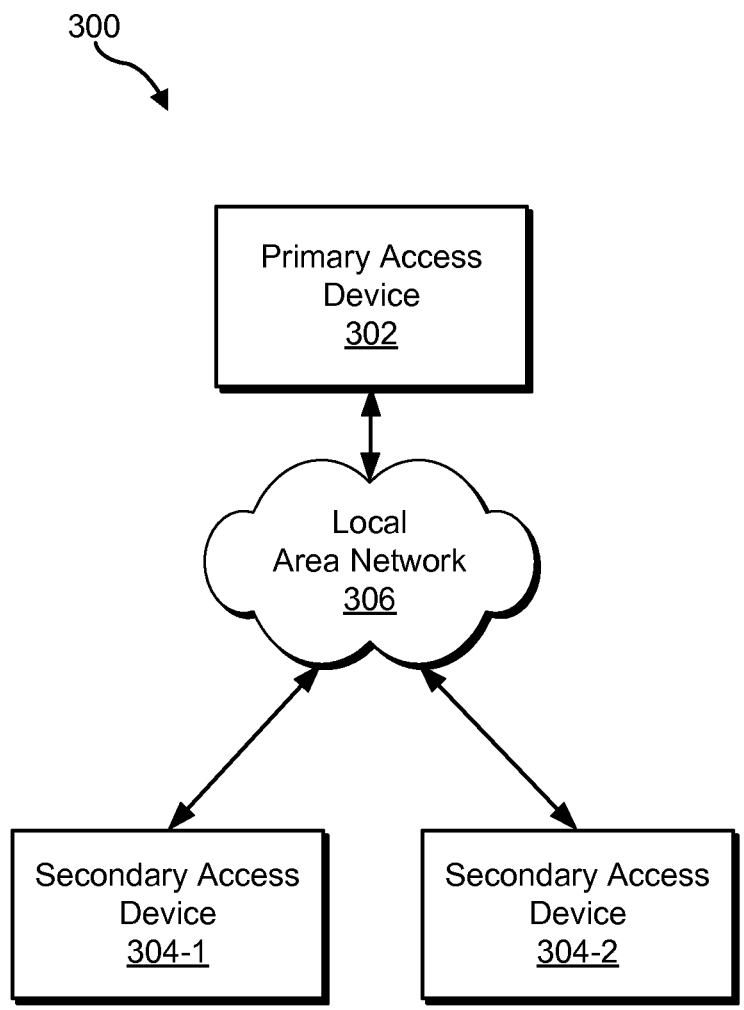
FIG. 3 shows an exemplary configuration wherein a primary access device and two secondary access devices are each connected to a local area network according to principles described herein.

To illustrate, FIG. 3 shows an exemplary configuration 300 wherein a primary access device 302 and two secondary access devices 304 (e.g., secondary access devices 304-1 and 304-2) are each connected to a local area network 306. Local area network 306 may include a home Wi-Fi network, for example, and may be configured to facilitate communication between primary access device 302 and secondary access devices 304. In some examples, detection facility 104 may detect that secondary access devices 304 are connected to local area network 306 and thereby determine that secondary access devices 304 are within a detection zone associated with primary access device 302.

Returning to FIG. 1, application management facility 106 may be configured to manage (e.g., generate, select, modify, store, transmit, etc.) one or more executable applications that may be related to one or more media content instances that are presented by way of a primary access device.

For example, application management facility 106 may direct a primary access device to generate and deliver a personalized version of an executable application related to a media content instance to a secondary access device for execution by the secondary access device during a presentation of the media content instance by the primary access device. To illustrate, application management facility 106 may direct the primary access device to modify an executable application (e.g., by specifying one or more custom settings and/or features of the executable application) that has been stored or buffered by the primary access device and then deliver the modified executable application to the secondary access device.

Alternatively, application management facility 106 may direct the primary access device to select a particular version of the executable application from a plurality of different versions of the executable application that have been already stored by the primary access device and then provide the selected version of the executable application to the secondary access device. For example, five versions of a particular application may be initially delivered to the primary access device. Based on a user profile associated with a user, application management facility 106 may direct the primary access device to select one of the versions of the application and provide the selected version to a secondary access device associated with the user.

In some examples, application management facility 106 may determine that an application as originally delivered to the primary access device is already personalized for a particular user. In these examples, application management facility 106 may direct the primary access device to deliver an unmodified version of the application to a secondary access device associated with the user.

In cases in which application management facility 106 is entirely implemented by a media content provider subsystem that is separate from the primary access device, application management facility 106 may generate the personalized version of the executable application before it is delivered to the primary access device and/or the secondary access device. Examples of this will be provided below.

Various personalization heuristics (e.g., manners in which application management facility 106 may direct a primary access device to generate a personalized version of an executable application) will now be described. It will be recognized that a personalized version of an application may be generated in any other suitable way not described specifically herein. It will also be recognized that any of the personalization heuristics described herein may alternatively be performed by application management facility 106 itself (e.g., in cases in which application management facility 106 is entirely implemented by a media content provider subsystem that is separate from the primary access device).

In some examples, application management facility 106 may direct a primary access device to generate a personalized version of an executable application for delivery to a secondary access device associated with a user in accordance with a user profile associated with the user. For example, a user profile associated with a user may include data representative of one or more of the user's traits (e.g., one or more demographic attributes of the user), preferences (e.g., genre preferences, product preferences, etc.), tendencies (e.g., viewing habits), and/or any other type of information associated with the user. Using this information, application management facility 106 may direct the primary access device to appropriately generate a personalized version of the executable application for the user.

For example, a user profile associated with a first user watching an advertisement for a particular type of energy drink by way of a primary access device may indicate that the first user is male, twenty-one years old, and often watches NASCAR racing. However, a user profile associated with a second user watching the advertisement with the first user may indicate that the second user is female, forty-five years old, and likes to exercise. Because the user profiles of the two users are different one from another, application management facility 106 may generate different personalized versions of an executable application related to the advertisement for execution by each user's secondary access device during the presentation of the advertisement for the energy drink. To illustrate, application management facility 106 may generate a personalized version of the application that focuses on and/or includes one or more NASCAR drivers promoting the energy drink for delivery to the first user's secondary access device. Likewise, application management facility 106 may generate a personalized version of the application that focuses on health statistics of the energy drink for delivery to the second user by way of the second user's secondary access device.

In some examples in which multiple users are watching or otherwise experiencing a media content instance together as a group, application management facility 106 may direct the primary access device to generate a personalized version of an application related to the media content instance for delivery to a particular user's secondary access device in accordance with the collective user profiles of all of the users in the group. In this manner, the presence of one or more friends, family members, etc. of a user may affect how the application is personalized for the user. For example, the user profiles associated with a group of users watching a particular media content instance together may indicate that the group of users includes only teenage girls. Hence, application management facility 106 may personalize an application that presents an interactive game related to the media content instance for a particular girl included in the group by including features in the interactive game that promote interaction and/or activity by the group of girls as a whole.

In some examples, application management facility 106 may direct a primary access device to generate a personalized version of an executable application for delivery to a secondary access device associated with a user in accordance with a course correction heuristic. A "course correction heuristic" may include any heuristic or technique that refines, adjusts, or otherwise improves the manner in which an application is personalized for a particular user over the course of time.

To illustrate, application management facility 106 may direct a primary access device to generate a personalized version of an executable application for delivery to a secondary access device associated with a user by analyzing an operation history descriptive of one or more operations performed by the secondary access device prior to the presentation of the media content instance. Application management facility 106 may then direct the primary access device to generate the personalized version of the executable application based on the operation history. For example, in some cases, user profile information associated with a user of a particular secondary access device may be unavailable to application management facility 106. To ascertain one or more traits, preferences, and/or tendencies of the user using the secondary access device, application management facility 106 may analyze an operation history of the secondary access device. For example, application management facility 106 may analyze a web browsing history by way of the secondary access device, an application interaction history by way of the secondary access device, and/or any other type of operation performed by way of the secondary access device in order to predict application features in which the user of the secondary access device may be interested. Using this information, application management facility 106 may generate a personalized version of the application that is potentially of interest to the user.

Additionally or alternatively, application management facility 106 may direct a primary access device to generate a personalized version of an executable application for delivery to a secondary access device associated with a user by detecting and/or analyzing one or more ambient actions performed by one or more users located within the detection zone associated with the primary access device and directing the primary access device to generate the personalized version of the executable application based on the detected ambient action(s). As used herein, the term "ambient action" may refer to any action performed by a user that is independent of and/or not directed at the primary access device. For example, an ambient action may include any action performed by a user during a presentation of a media content instance by way of the primary access device, whether the user is actively experiencing (e.g., actively viewing) or passively experiencing (e.g., passively viewing and/or listening while the user is doing something else) the media content instance.

To illustrate, an exemplary ambient action may include a user eating, exercising, laughing, reading, sleeping, talking, singing, humming, cleaning, playing a musical instrument, performing any other suitable action, and/or engaging in any other physical activity during the presentation of the media content. In certain examples, the ambient action may include an interaction by a user with another user (e.g., another user physically located in the same room as the user). For example, the ambient action may include a user talking to, cuddling with, fighting with, wrestling with, playing a game with, competing with, and/or otherwise interacting with the other user. In further examples, the ambient action may include the user interacting with a secondary access device. For example, the ambient action may include the user interacting with a mobile device (e.g., a mobile phone device, a tablet computer, a laptop computer, etc.) immediately prior to and/or during the presentation of a media content instance by a set-top box device.

Application management facility 106 (and/or detection facility 104) may be configured to detect an ambient action in any suitable manner. In certain examples, application management facility 106 may utilize, implement, and/or be implemented by a detection device configured to detect one or more attributes of an ambient action, a user, and/or a user's surroundings. An exemplary detection device may include one or more sensor devices, such as an image sensor device (e.g., a camera device, such as a red green blue ("RGB") camera or any other suitable camera device), a depth sensor device (e.g., an infrared laser projector combined with a complementary metal-oxide semiconductor ("CMOS") sensor or any other suitable depth sensor and/or 3D imaging device), an audio sensor device (e.g., a microphone device such as a multi-array microphone or any other suitable microphone device), a thermal sensor device (e.g., a thermographic camera device or any other suitable thermal sensor device), and/or any other suitable sensor device or combination of sensor devices, as may serve a particular implementation.

Application management facility 106 may be configured to analyze data received by way of a detection device in order to identify an ambient action performed by one or more users and/or any other type of attribute of the one or more users. For example, application management facility 106 may analyze the received data utilizing one or more motion capture technologies, motion analysis technologies, gesture recognition technologies, facial recognition technologies, voice recognition technologies, acoustic source localization technologies, and/or any other suitable technologies to detect one or more actions (e.g., movements, motions, gestures, mannerisms, etc.) of the user, a location of the user, a proximity of the user to another user, one or more physical attributes (e.g., size, build, hair length, facial features, and/or any other suitable physical attributes) of the user, one or more voice attributes (e.g., tone, pitch, inflection, language, accent, amplification, and/or any other suitable voice attributes) associated with the user's voice, one or more physical surroundings of the user (e.g., one or more inanimate physical objects proximate to and/or held by the user), and/or any other suitable information associated with the user.

Application management facility 106 may direct a primary access device to generate a personalized version of an executable application for delivery to a secondary access device associated with a user based on a detected ambient action in any suitable manner. To illustrate, application management facility 106 may detect that a user is singing or humming a song. Using any suitable signal processing heuristic, application management facility 106 may identify a name, genre, and/or type of the song. Based on this information, application management facility 106 may determine that the user is in a particular mood. For example, the user may be singing or humming a generally "happy" song. In response, application management facility 106 may determine that the user is in a cheerful mood. Accordingly, application management facility 106 may generate a personalized version of an executable application that is configured to target happy people. For example, application management facility 106 may select a cheerful color scheme to be included in the personalized version of the executable application.

In another example, application management facility 106 may determine that a user is holding and/or interacting with a mobile device. For example, application management facility 106 may determine that the user is sitting on a couch and interacting with a tablet computer during the presentation of a television program by way of a primary access device. In some examples, application management facility 106 may be configured to communicate with the mobile device in order to receive data indicating what the user is doing with the mobile device (e.g., data indicating that the user is utilizing the mobile device to browse the web, draft an email, review a document, read an e-book, etc.) and/or representative of content that the user is interacting with (e.g., representative of one or more web pages browsed by the user, an email drafted by the user, a document reviewed by the user, an e-book read by the user, etc.). Based on this information, an appropriate personalized version of an executable application may be generated for the user.

Additionally or alternatively, application management facility 106 may detect a presence of an inanimate physical object within a detection zone associated with a primary access device and direct the primary access device to generate a personalized version of an executable application for delivery to a secondary access device associated with a user based on the detected physical object. For example, application management facility 106 may utilize a detection device, such as that described above, to detect and/or identify an animal (e.g., a dog, cat, bird, etc.), a retail product (e.g., a soft drink can, a bag of chips, etc.), furniture (e.g., a couch, a chair, etc.), a decoration (e.g., a painting, a photograph, etc.), and/or any other physical object located within the detection zone. Based on the detected object, application management facility 106 may generate an appropriate personalized version of an executable application for a user.

To illustrate, application management facility 106 may detect that a piano is located within a detection zone associated with a primary access device. Based on this information, application management facility 106 may deduce that a user located in the detection zone may play the piano. Accordingly, application management facility 106 may generate a personalized version of an executable application that plays piano music in the background for execution by the user's secondary access device.

Additionally or alternatively, application management facility 106 may detect a sharing of a particular application with the user by another user prior to the presentation of the media content instance by way of the primary access device and direct the primary access device to personalize a newly delivered application based on the shared application.

To illustrate, a friend of the user may share (e.g., forward, send a link to, etc.) a first-person shooter video game with the user. Application management facility 106 may detect this sharing and thereby deduce that the user is likely interested in the military. Application management facility 106 may then generate a military-themed version of an executable application for execution by the user's secondary access device.

Additionally or alternatively, application management facility 106 may detect an interaction of the user with one or more applications prior to the presentation of the media content instance by way of the primary access device and direct the primary access device to personalize a newly delivered application based on the detected interaction.

To illustrate, application management facility 106 may detect that a user interacts with (e.g., views, shares, saves, etc.) applications that offer coupons for use by the user. Based on this interaction, application management facility 106 may determine that the user is interested in receiving coupons. Subsequently, application management facility 106 may generate a personalized version of an application by configuring the application to present one or more coupons to the user (e.g., in the form of one or more downloadable PDFs).

As another example, a user may "unlock" (i.e., gain access to) content after interacting with a particular application. For example, a user may gain access to a coupon for a store after interacting with an application associated with (e.g., provided by) the store. Application management facility 106 may track which content has been unlocked by a particular user over time and utilize this information to generate personalized versions of subsequently delivered applications that better target the user. Moreover, such tracking may allow a service provider associated with application management facility 106 to more effectively charge vendors for delivering applications to particular users. For example, application management facility 106 may determine that a particular user has interacted with a relatively large number of applications and accordingly increase the cost to a vendor for providing applications to the user.

Additionally or alternatively, application management facility 106 may detect an interaction of the user with the media content instance being presented by way of the primary access device and direct the primary access device to personalize an application related to the media content instance based on the detected interaction. Exemplary interactions by the user that may be detected include the user adjusting a volume level, switching to a different channel, pausing or resuming the presentation of the media content instance, etc.

To illustrate, application management facility 106 may detect that a user has increased a volume level associated with a presentation of a media content program (e.g., a television program) while viewing a particular scene within the media content program. This may indicate that the user is interested in the contents of the particular scene. Hence, application management facility 106 may personalize an application related to the media content program for the user by configuring the application to present content related to the content being shown within the particular scene.

In some examples, application management facility 106 may direct the primary access device to automatically provide a personalized version of an application to a secondary access device. In this manner, the user may interact with the personalized version of the application without having to request access to the application. For example, application management facility 106 may direct the primary access device to automatically transmit a personalized application to a secondary access device even if the secondary access device is "off" or in standby mode. In this manner, the user simply has to turn on the secondary access device to access the personalized application.

In some examples, if the user does not access an application that has been delivered to a secondary access device during a predetermined time period (e.g., within a certain amount of time of the application's related media content instance being presented), application management facility 106 may be configured to automatically delete the application from the secondary access device or otherwise disable access to the application. It will be recognized that one or more options associated with deleting applications from the secondary access device may be specified by the user, a service provider, and/or an application provider as may serve a particular implementation.

Application management facility 106 may direct the primary access device to provide a personalized version of an application to a secondary access device in response to a user request for the application. For example, a user may provide a request to purchase the application in response to an advertisement being presented for the application. In response, application management facility 106 may direct the primary access device to generate and provide a personalized version of an application to the user's secondary access device. For example, a user may purchase a particular level of access to the application (e.g., access to all available features of the application). Application management facility 106 may accordingly direct the primary access device to generate and provide a version of the application that has all of its features enabled to the user's secondary access device.

Figure 4:
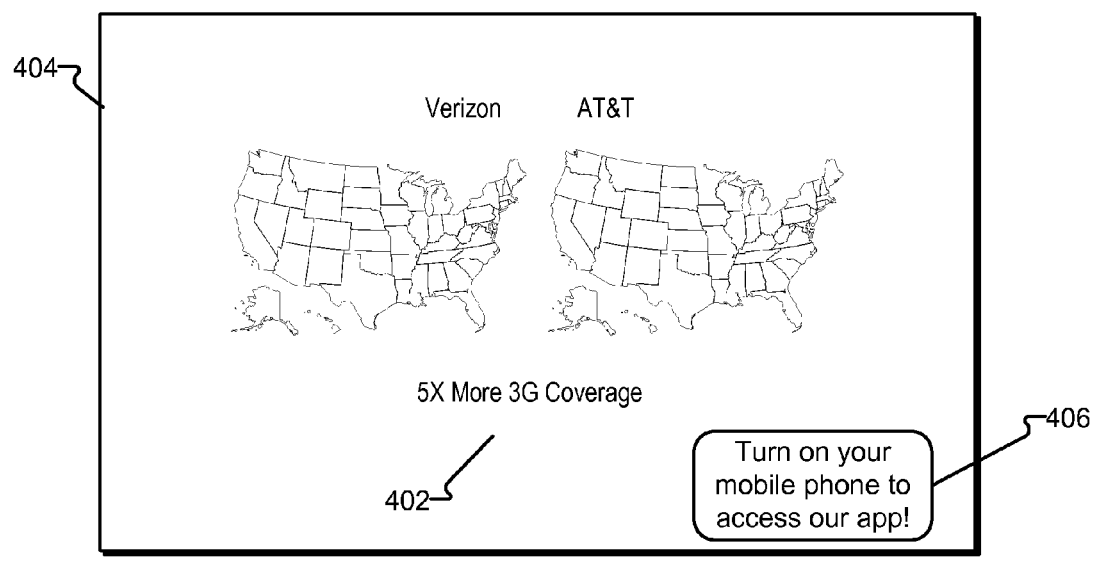
FIG. 4 shows a graphic configured to provide a notification of an availability of a personalized version of an application according to principles described herein.

In some examples, application management facility 106 may be configured to provide a notification of an availability of a personalized version of an application. In this manner, the user may know when he or she may access the personalized application by way of his or her secondary access device. To illustrate, FIG. 4 shows an exemplary configuration wherein an advertisement 402 for a mobile phone service may be displayed by a display screen 404 associated with a primary access device. During the presentation of advertisement 402, a mobile phone may be located within a detection zone associated with the primary access device. System 100 may generate and deliver a personalized version of an application to the mobile phone in any of the ways described herein. A notification 406 may then be displayed within display screen 404 notifying a user of the mobile phone that he or she may access an application related to advertisement 402 by turning on, unlocking, or otherwise using the mobile phone. Notification 406 may alternatively be presented in any other manner as may serve a particular implementation.

Returning to FIG. 1, storage facility 108 may be configured to maintain media content data 110 representative of one or more media content instances, application data 112 representative of one or more applications and/or personalized versions of an application, detection data 114 representative of data and/or information detected/obtained by detection facility 104, and user profile data 116 representative of user profile information associated with one or more users. Storage facility 108 may be configured to maintain additional or alternative data as may serve a particular implementation.

Figure 5:
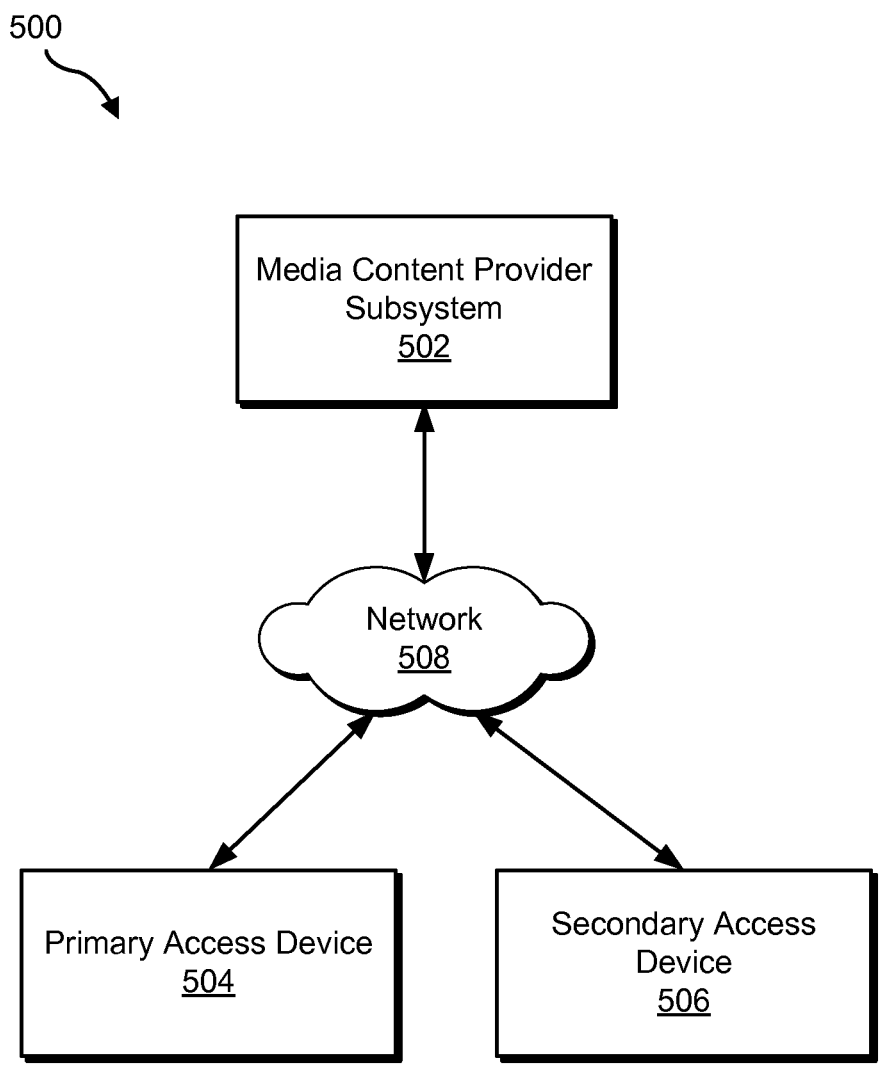
FIG. 5 illustrates an exemplary implementation of the system of FIG. 1 according to principles described herein.

FIG. 5 illustrates an exemplary implementation 500 of system 100 wherein a media content provider subsystem 502 is communicatively coupled to a primary access device 504 and a secondary access device 506 by way of a network 508. As will be described in more detail below, delivery facility 102, detection facility 104, application management facility 106, and storage facility 108 may each be implemented by one or more of media content provider subsystem 502, primary access device 504, and secondary access device 506.

Media content provider subsystem 502 may be associated with a service provider (e.g., a subscriber television service provider, an Internet service provider, etc.), a media content instance provider (e.g., ESPN, etc.), and/or an executable application provider (e.g., an application vendor). Accordingly, media content provider subsystem 502 may be configured to provide one or more content services (e.g., television services, video-on-demand services, Internet services, application services, etc.) to primary access device 504 and/or secondary access device 506. For example, media content provider subsystem 502 may be configured to manage (e.g., maintain, process, distribute, and/or generate) media content (e.g., media content programs, advertisements, etc.) and/or applications configured to be delivered to primary access device 504 and/or secondary access device 506.

Primary access device 504 may be configured to facilitate access by a user to content (e.g., media content programs and/or advertisements) provided (e.g., streamed) by media content provider subsystem 502 and/or content stored locally by primary access device 504. Primary access device 504 may be implemented by any suitable access device, such as a set-top box device, a digital video recorder ("DVR") device, a personal computer, a mobile device (e.g., a mobile phone or a tablet computer), a personal-digital assistant device, a gaming device, a television device, and/or any other suitable computing device configured to access content.

Secondary access device 506 may be configured to execute (e.g., facilitate user access to) one or more applications related to media content presented by way of primary access device 504. Secondary access device 506 may be implemented by any suitable access device, such as a set-top box device, a DVR device, a personal computer, a mobile device (e.g., a mobile phone or a tablet computer), a personal-digital assistant device, a gaming device, a television device, and/or any other suitable computing device configured to execute applications.

Media content provider subsystem 502, primary access device 504, and/or secondary access device 506 may each be implemented by one or more computing devices. For example, media content provider subsystem 502, primary access device 504, and/or secondary access device 506 may be implemented by one or more server devices, access devices, and/or other computing devices.

Media content provider subsystem 502, primary access device 504, and/or secondary access device 506 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

Media content provider subsystem 502, primary access device 504, and/or secondary access device 506 may communicate using any suitable network. For example, as shown in FIG. 5, media content provider subsystem 502, primary access device 504, and/or secondary access device 506 may be configured to communicate with each other by way of network 508. Network 508 may include one or more networks or types of networks capable of carrying communications and/or data signals between the components of system 100. For example, network 508 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

In certain embodiments, system 100 may be implemented entirely by media content provider subsystem 502 or by primary access device 504. In other embodiments, components of system 100 may be distributed across media content provider subsystem 502, primary access device 504, and/or secondary access device 506.

Figure 6:
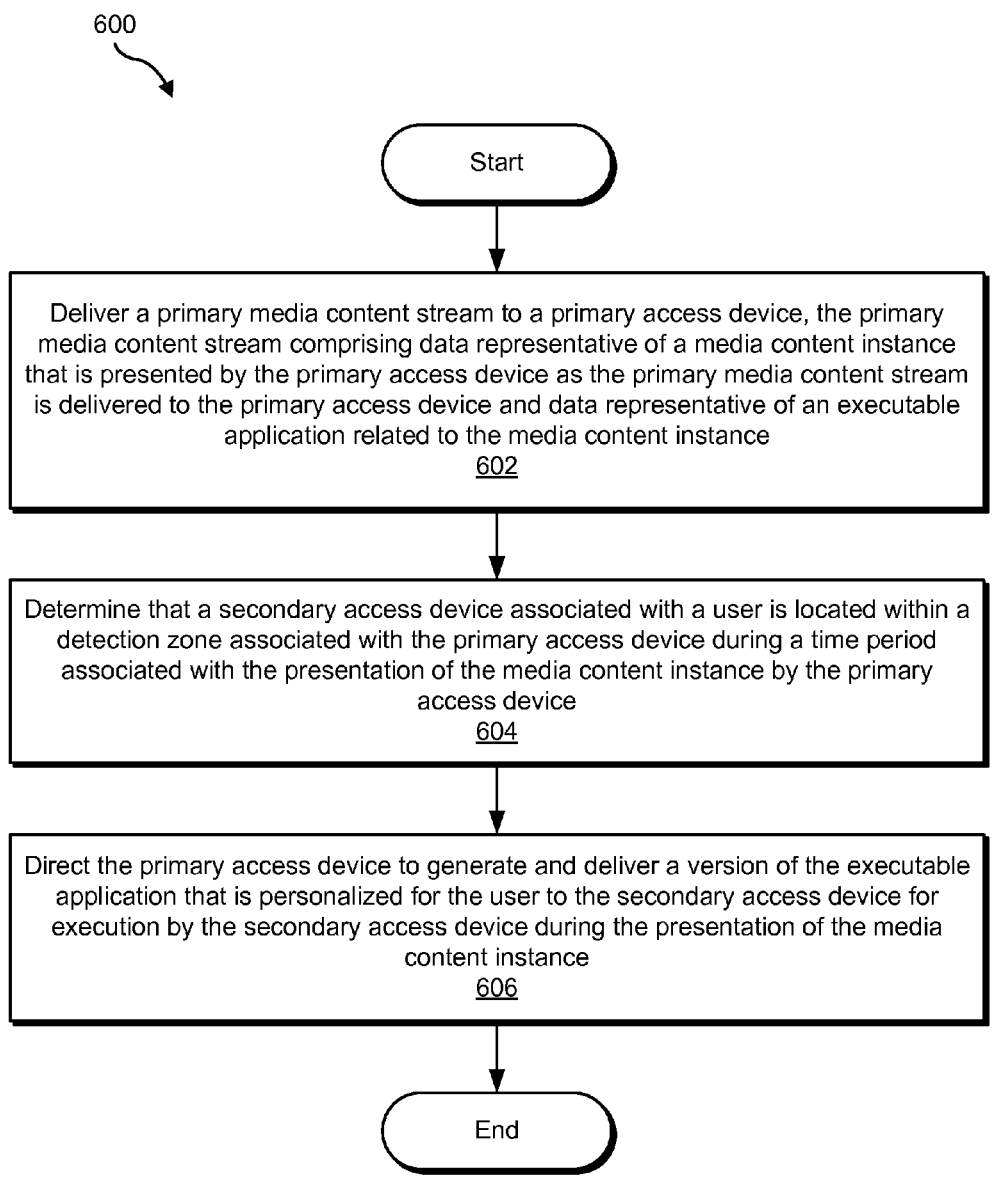
FIGS. 6-8 illustrate various methods of delivering a personalized version of an executable application to a secondary access device associated with a user according to principles described herein.

FIG. 6 illustrates an exemplary method 600 of delivering a personalized version of an executable application to a secondary access device associated with a user. While FIG. 6 illustrates exemplary steps according to one embodiment, other embodiments may omit, add to, reorder, and/or modify any of the steps shown in FIG. 6. One or more of the steps shown in FIG. 6 may be performed by any component or combination of components of system 100, media content provider subsystem 502, primary access device 504, and/or secondary access device 506.

In step 602, a media content presentation system delivers a primary media content stream to a primary access device. For example, media content provider subsystem 502 may deliver the primary media content stream to primary access device 504. The primary media content stream includes data representative of a media content instance that is presented by the primary access device as the primary media content stream is delivered to the primary access device and data representative of an executable application related to the media content instance. Step 602 may be performed in any of the ways described herein.

In step 604, the media content presentation system determines that a secondary access device associated with a user is located within a detection zone associated with the primary access device during a time period associated with the presentation of the media content instance by the primary access device. For example, media content provider subsystem 502 and/or primary access device 504 may determine that secondary access device 506 is located within a detection zone associated with primary access device 504. Step 604 may be performed in any of the ways described herein.

In step 606, the media content presentation system directs the primary access device to generate and deliver a version of the executable application that is personalized for the user to the secondary access device for execution by the secondary access device during the presentation of the media content instance. For example, media content provider subsystem 502 and/or primary access device 504 may direct primary access device 504 to generate and deliver the personalized version of the executable application to secondary access device 506. Step 606 may be performed in any of the ways described herein.

Figure 7:
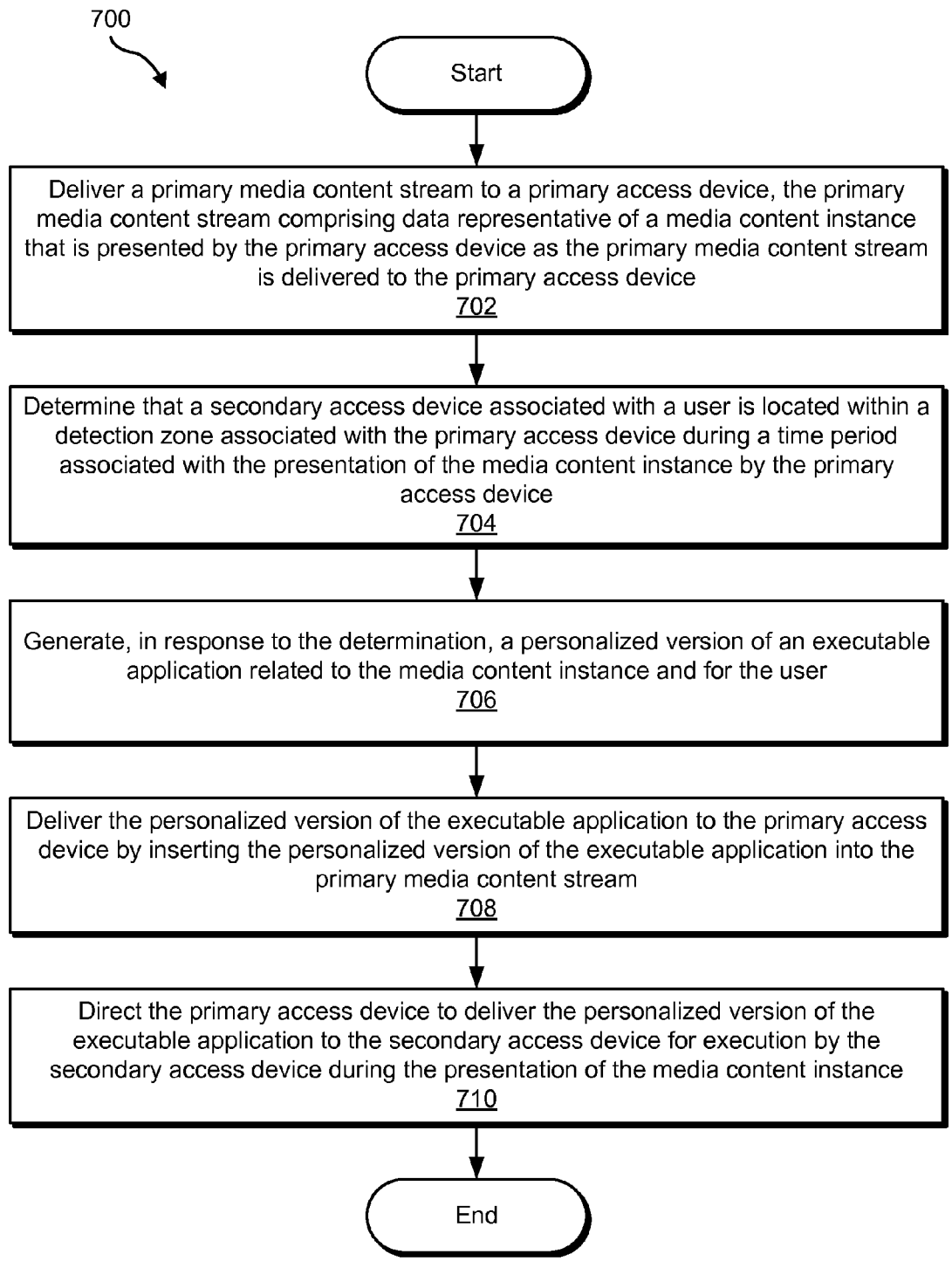

FIG. 7 illustrates another exemplary method 700 of delivering a personalized version of an executable application to a secondary access device associated with a user. While FIG. 7 illustrates exemplary steps according to one embodiment, other embodiments may omit, add to, reorder, and/or modify any of the steps shown in FIG. 7. One or more of the steps shown in FIG. 7 may be performed by any component or combination of components of system 100, media content provider subsystem 502, primary access device 504, and/or secondary access device 506.

In step 702, a media content presentation system delivers a primary media content stream to a primary access device. For example, media content provider subsystem 502 may deliver the primary media content stream to primary access device 504. The primary media content stream includes data representative of a media content instance that is presented by the primary access device as the primary media content stream is delivered to the primary access device. In this example, the primary media content stream does not initially include data representative of an executable application. Step 702 may be performed in any of the ways described herein.

In step 704, the media content presentation system determines that a secondary access device associated with a user is located within a detection zone associated with the primary access device during a time period associated with the presentation of the media content instance by the primary access device. For example, media content provider subsystem 502 and/or primary access device 504 may determine that secondary access device 506 is located within a detection zone associated with primary access device 504. Step 704 may be performed in any of the ways described herein.

In step 706, the media content presentation system generates, in response to the determination in step 704, a personalized version of an executable application related to the media content instance and for the user. For example, media content provider subsystem 502 may generate the personalized version of the executable application. Step 706 may be performed in any of the ways described herein.

In step 708, the media content presentation system delivers the personalized version of the executable application to the primary access device by inserting the personalized version of the executable application into the primary media content stream. For example, media content provider subsystem 502 may insert the personalized version of the executable application into the primary media content stream that is delivered to primary access device 504. The personalized version of the executable application may be inserted into the primary media content stream in any suitable manner as may serve a particular implementation. For example, data packets comprising data representative of the personalized version of the executable application may be multiplexed into or otherwise included in the primary media content stream. In some examples, the primary media content stream may include a transport stream having multiple elementary data streams bundled therein. In these cases, the personalized version of the executable application may be included in any of the elementary data streams.

In step 710, the media content presentation system directs the primary access device to deliver the personalized version of the executable application to the secondary access device for execution by the secondary access device during the presentation of the media content instance. For example, media content provider subsystem 502 and/or primary access device 504 may direct primary access device 504 to deliver the personalized version of the executable application to secondary access device 506. Step 710 may be performed in any of the ways described herein.

Figure 8:
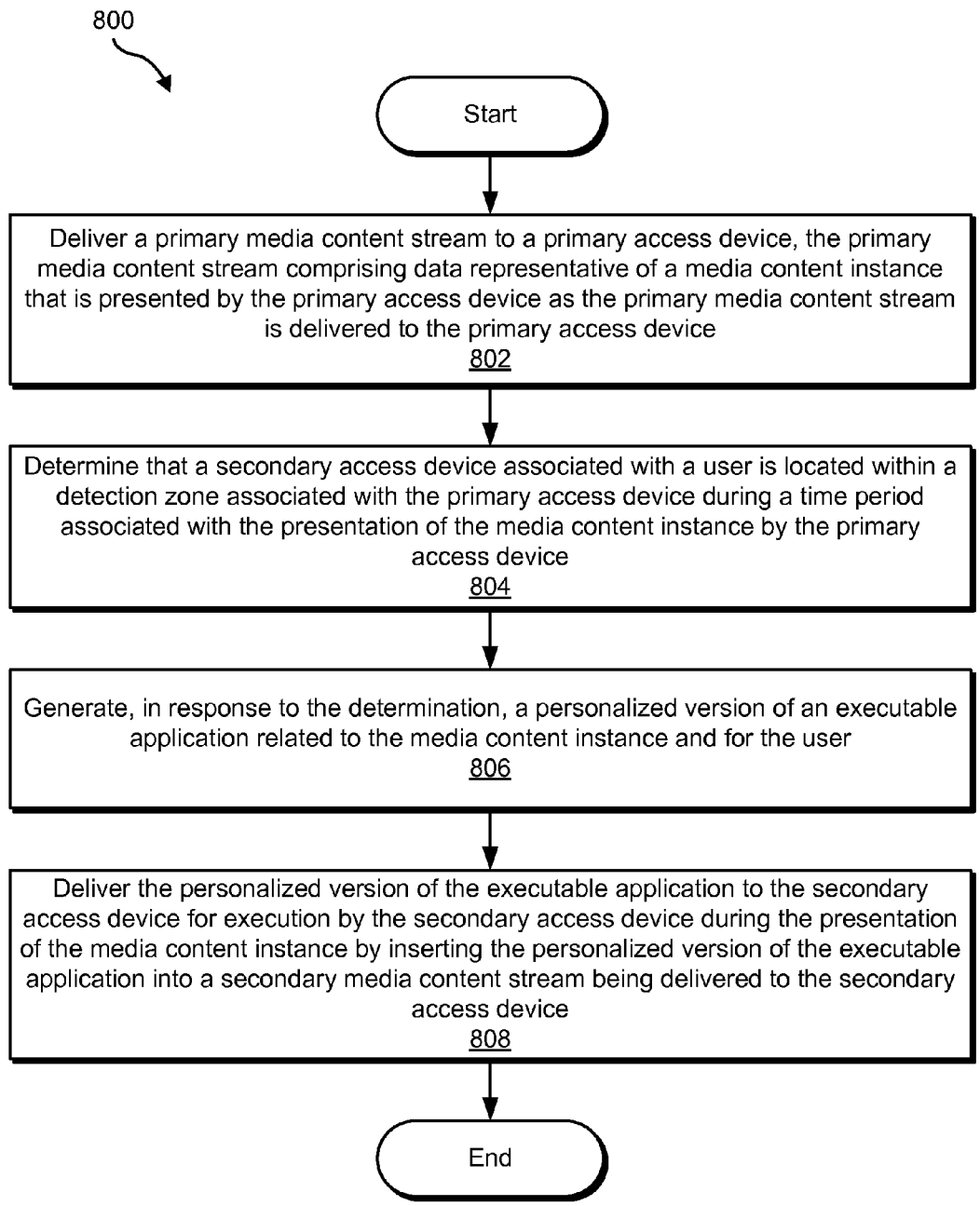

FIG. 8 illustrates another exemplary method 800 of delivering a personalized version of an executable application to a secondary access device associated with a user. While FIG. 8 illustrates exemplary steps according to one embodiment, other embodiments may omit, add to, reorder, and/or modify any of the steps shown in FIG. 8. One or more of the steps shown in FIG. 8 may be performed by any component or combination of components of system 100, media content provider subsystem 502, primary access device 504, and/or secondary access device 506.

In step 802, a media content presentation system delivers a primary media content stream to a primary access device. For example, media content provider subsystem 502 may deliver the primary media content stream to primary access device 504. The primary media content stream includes data representative of a media content instance that is presented by the primary access device as the primary media content stream is delivered to the primary access device. In this example, the primary media content stream does not include data representative of an executable application. Step 802 may be performed in any of the ways described herein.

In step 804, the media content presentation system determines that a secondary access device associated with a user is located within a detection zone associated with the primary access device during a time period associated with the presentation of the media content instance by the primary access device. For example, media content provider subsystem 502 and/or primary access device 504 may determine that secondary access device 506 is located within a detection zone associated with primary access device 504. Step 804 may be performed in any of the ways described herein.

In step 806, the media content presentation system generates, in response to the determination in step 804, a personalized version of an executable application related to the media content instance and for the user. For example, media content provider subsystem 502 may generate the personalized version of the executable application. Step 806 may be performed in any of the ways described herein.

In step 808, the media content presentation system delivers the personalized version of the executable application to the secondary access device for execution by the secondary access device during the presentation of the media content instance by inserting the personalized version of the executable application into a secondary media content stream being delivered to the secondary access device. For example, media content provider subsystem 502 may insert the personalized version of the executable application into a secondary media content stream being delivered by to media content provider subsystem 502 to secondary access device 506. In some examples, the secondary media content stream being streamed to the secondary access device may include data representative of a secondary media content instance related to the media content instance being presented by way of the primary access device. For example, the secondary media content stream may include advertisement content related to a television program, an advertisement, or other type of media content instance being presented by way of the primary access device. In this manner, the user may interact with both the secondary media content instance and the personalized application by way of his or her secondary access device.

Figure 9:
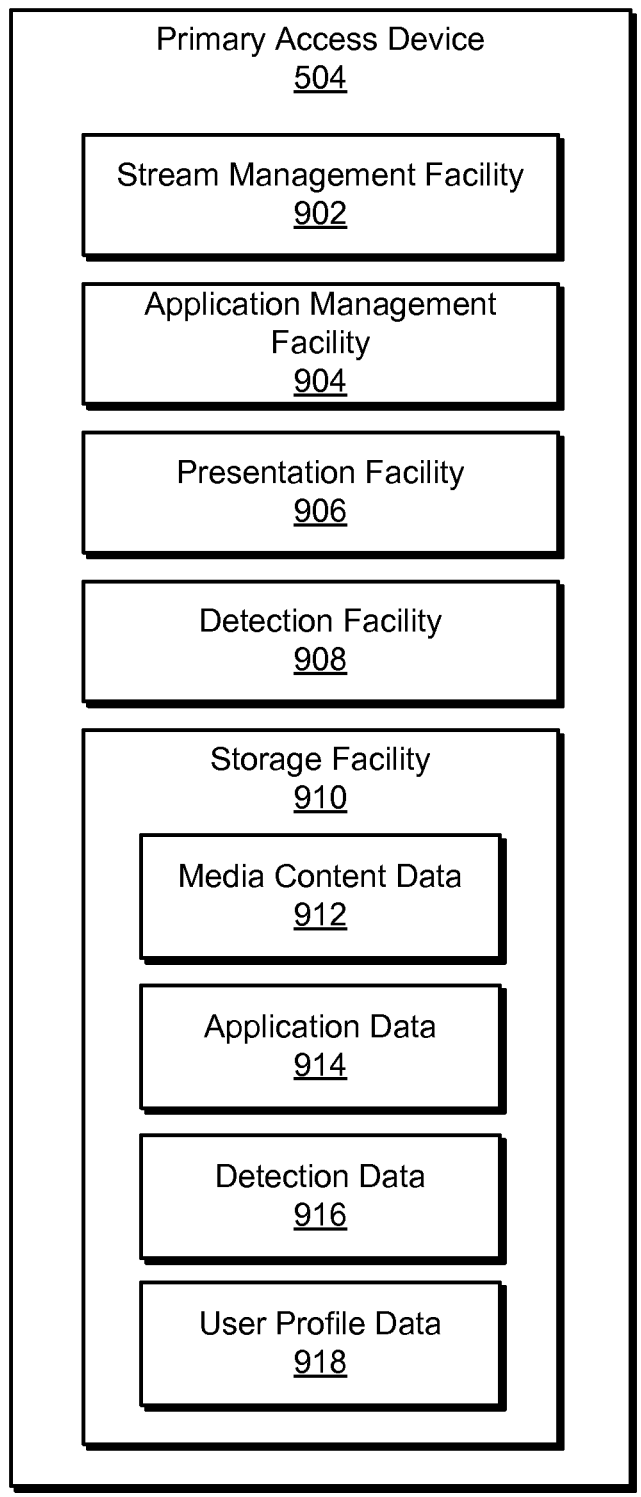
FIG. 9 illustrates various components of an exemplary primary access device according to principles described herein.

As mentioned, a primary access device (e.g., primary access device 504) may be configured to perform one or more of the operations described herein. For example, FIG. 9 shows various components that may be included within primary access device 504 and that may be configured to perform various operations associated with the delivery of a personalized version of an executable application to a secondary access device (e.g., secondary access device 506). As shown, primary access device 504 may include, without limitation, a stream management facility 902, an application management facility 904, a presentation facility 906, a detection facility 908, and a storage facility 910 selectively and communicatively coupled to one another. It will be recognized that although facilities 902-910 are shown to be separate facilities in FIG. 9, any of facilities 902-910 may be combined into fewer facilities, such as into a single facility, or divided into more facilities as may serve a particular implementation.

Stream management facility 902 may be configured to manage (e.g., receive, decode, and/or otherwise process) media content streams. For example, stream management facility 902 may receive a primary media content stream from a media content provider subsystem (e.g., media content provider subsystem 502). As described above, the primary media content stream may include data representative of a media content instance and data representative of an executable application related to the media content instance.

Application management facility 904 may be configured to manage (e.g., generate, select, modify, store, transmit, etc.) one or more executable applications that may be related to one or more media content instances that are presented by way of primary access device 504. For example, application management facility 904 may store or buffer the executable application based on the data representative of the executable application that is included in the primary media content stream.

To illustrate, as described above, the data representative of the executable application may include a link to a remote computing device that maintains the executable application. In this case, application management facility 904 may use the link to connect to the remote computing device and download the executable application from the remote computing device.

Alternatively, the data representative of the executable application may include one or more data files that constitute the executable application itself. In this case, application management facility 904 may extract the one or more data files from the primary media content stream and store the one or more data files (e.g., in some type of memory or storage unit).

Application management facility 904 may be further configured to generate a version of the executable application that is personalized for a user of a secondary access device. This may be performed in any of the ways described herein.

Presentation facility 906 may be configured to present one or more media content instances and/or other content for experiencing by a user. For example, presentation facility 906 may direct a display device included in or coupled to primary access device 504 to display a media content instance. In some examples, a media content instance is presented in real-time as the media content stream carrying the media content instance is received by stream management facility 902.

Detection facility 908 may be configured to determine that one or more secondary access devices are located within a detection zone associated with primary access device 504 during a time period associated with the presentation of the media content instance by primary access device 504. This may be performed in any of the ways described herein.

In response to a determination that a particular secondary access device associated with a particular user is located within a detection zone associated with primary access device 504, application management facility 904 may generate a version of the executable application that is personalized for the user. Application management facility 904 may then deliver the personalized version of the executable application to the secondary access device for execution by the secondary access device. This may be performed in any of the ways described herein.

Storage facility 910 may be configured to maintain media content data 912 representative of one or more media content instances, application data 914 representative of one or more applications and/or personalized versions of an application, detection data 916 representative of data and/or information detected/obtained by detection facility 908, and user profile data 918 representative of user profile information associated with one or more users. Storage facility 910 may be configured to maintain additional or alternative data as may serve a particular implementation.

Figure 10:
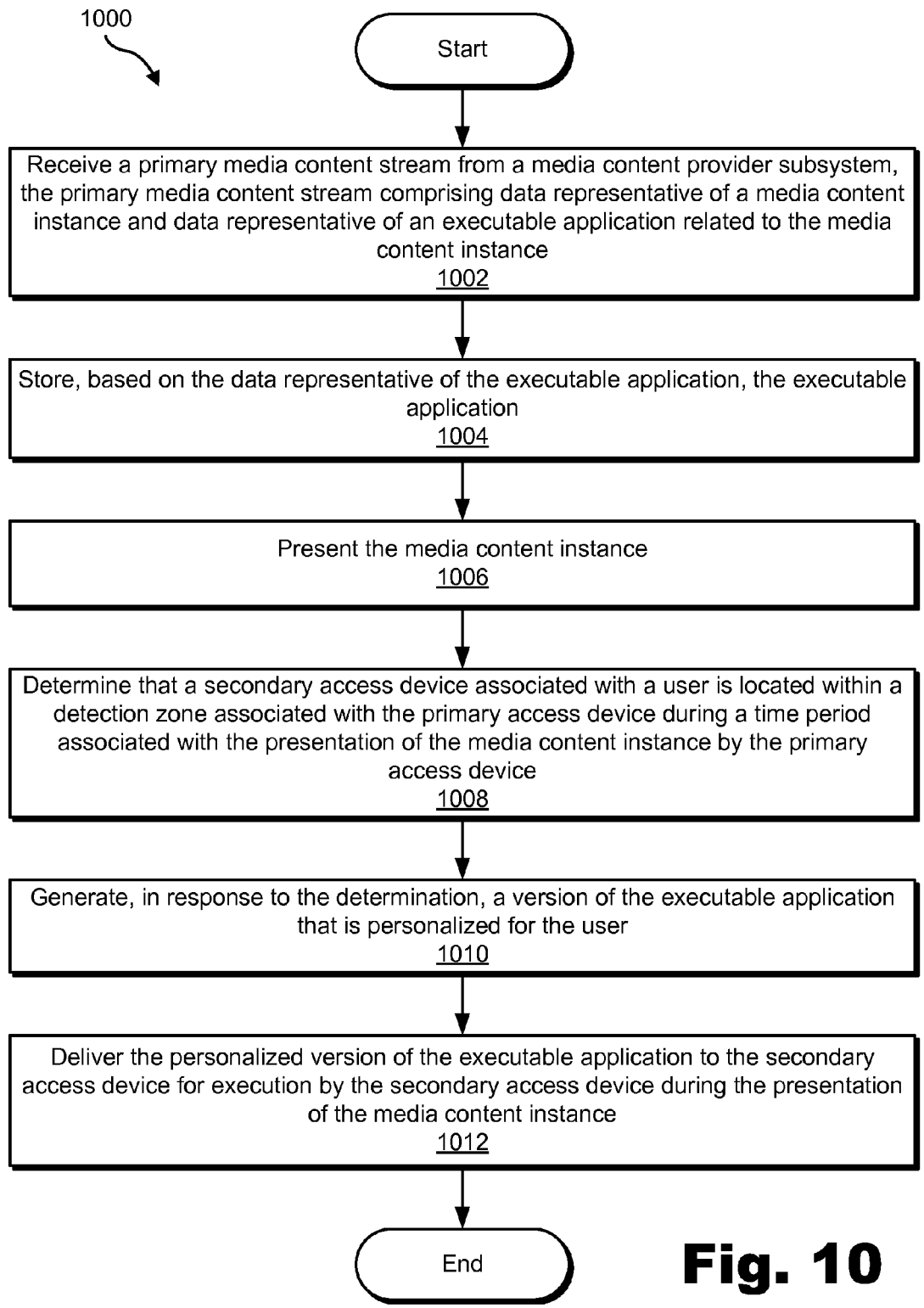
FIG. 10 illustrates another method of delivering a personalized version of an executable application to a secondary access device associated with a user according to principles described herein.

FIG. 10 illustrates another exemplary method 1000 of delivering a personalized version of an executable application to a secondary access device associated with a user. While FIG. 10 illustrates exemplary steps according to one embodiment, other embodiments may omit, add to, reorder, and/or modify any of the steps shown in FIG. 10. One or more of the steps shown in FIG. 10 may be performed by any component or combination of components of a primary access device (e.g., primary access device 504).

In step 1002, a primary access device receives a primary media content stream from a media content provider subsystem. The primary media content stream includes data representative of a media content instance and data representative of an executable application related to the media content instance. Step 1002 may be performed in any of the ways described herein.

In step 1004, the primary access device stores, based on the data representative of the executable application, the executable application. Step 1004 may be performed in any of the ways described herein.

In step 1006, the primary access device presents the media content instance. Step 1006 may be performed in any of the ways described herein.

In step 1008, the primary access device determines that a secondary access device associated with a user is located within a detection zone associated with the primary access device during a time period associated with the presentation of the media content instance by the primary access device. Step 1008 may be performed in any of the ways described herein.

In step 1010, the primary access device generates, in response to the determination in step 1008, a version of the executable application that is personalized for the user. Step 1010 may be performed in any of the ways described herein.

In step 1012, the primary access device delivers the personalized version of the executable application to the secondary access device for execution by the secondary access device during the presentation of the media content instance. Step 1012 may be performed in any of the ways described herein.

Figure 11:
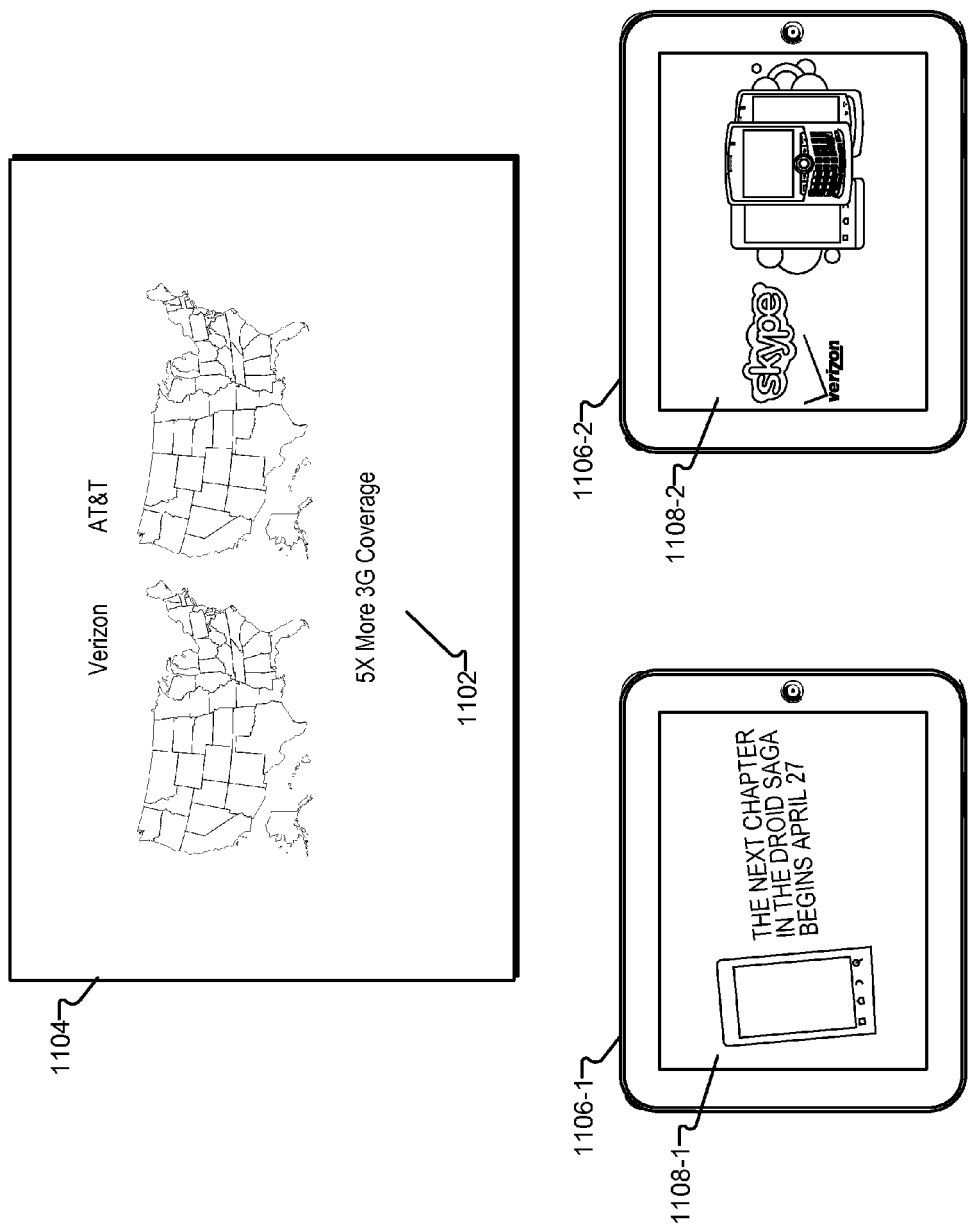
FIG. 11 shows an exemplary implementation of the methods and systems described herein.

FIG. 11 shows an exemplary implementation of the methods and systems described herein. As shown, an advertisement 1102 for a mobile phone service may be displayed by a display screen 1104 associated with a primary access device. As an advertisement stream carrying the advertisement 1102 is delivered to the primary access device, data representative of an application related to advertisement 1102 may be included in the advertisement stream. The primary access device may download and store the application in any of the ways described herein.

During the presentation of advertisement 1102 by the primary access device, two mobile devices 1106 (e.g., mobile device 1106-1 and mobile device 1106-2) may be located within a detection zone associated with the primary access device. System 100 may determine in any of the ways described herein that the user of mobile device 1106-1 is interested in technology and gadgets. Hence, system 100 may generate a personalized version of the application 1108-1 that promotes a particular type of mobile phone that may be used with the mobile phone service and deliver the personalized version to mobile device 1106-1 for execution by mobile device 1106-1 during and/or after the presentation of advertisement 1102. Likewise, system 100 may determine in any of the ways described herein that the user of mobile device 1106-2 is interested in calling features associated with the mobile phone service. Hence, system 100 may generate a different personalized version of the application 1108-2 that promotes a VOIP calling feature that may be used with the mobile phone service and deliver the personalized version to mobile device 1106-2 for execution by mobile device 1106-2 during and/or after the presentation of advertisement 1102 by way of the primary access device.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 12:
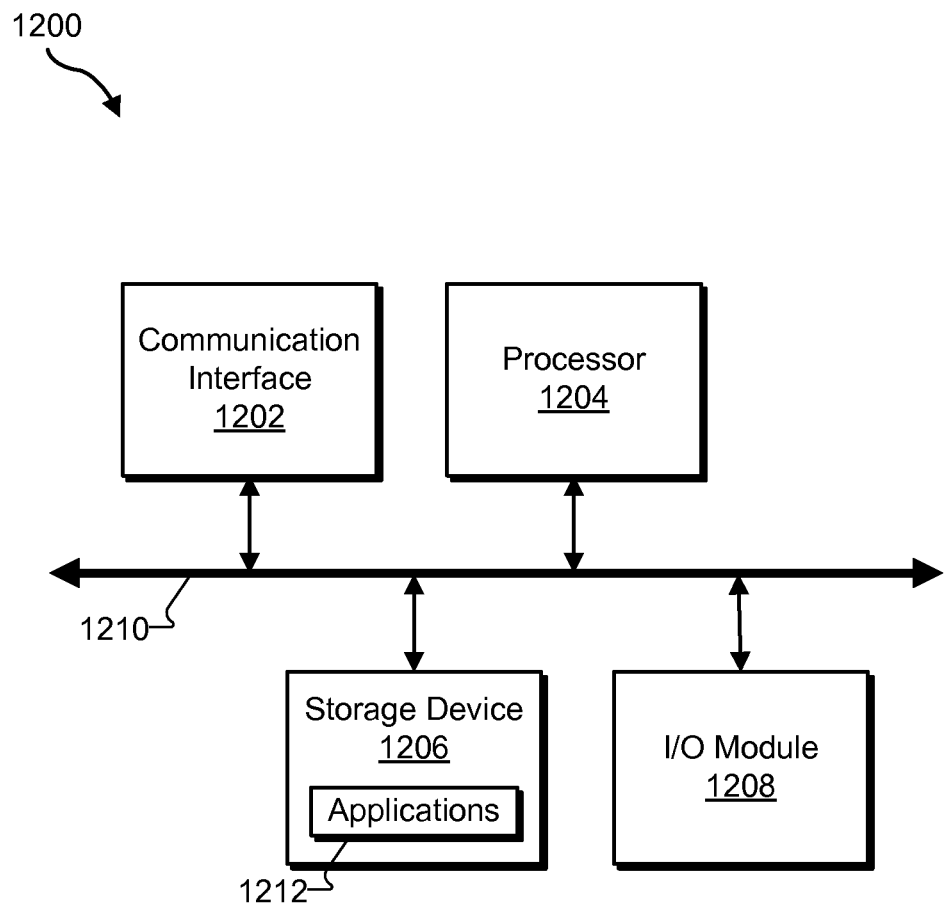
FIG. 12 illustrates an exemplary computing device according to principles described herein.

FIG. 12 illustrates an exemplary computing device 1200 that may be configured to perform one or more of the processes described herein. As shown in FIG. 12, computing device 1200 may include a communication interface 1202, a processor 1204, a storage device 1206, and an input/output ("I/O") module 1208 communicatively connected via a communication infrastructure 1210. While an exemplary computing device 1200 is shown in FIG. 12, the components illustrated in FIG. 12 are not intended to be limiting. Additional or alternative components may be used in other embodiments. Components of computing device 1200 shown in FIG. 12 will now be described in additional detail.

Communication interface 1202 may be configured to communicate with one or more computing devices. Examples of communication interface 1202 include, without limitation, a wired network interface (such as a network interface card), a wireless network interface (such as a wireless network interface card), a modem, an audio/video connection, and any other suitable interface.

Processor 1204 generally represents any type or form of processing unit capable of processing data or interpreting, executing, and/or directing execution of one or more of the instructions, processes, and/or operations described herein. Processor 1204 may direct execution of operations in accordance with one or more applications 1212 or other computer-executable instructions such as may be stored in storage device 1206 or another computer-readable medium.

Storage device 1206 may include one or more data storage media, devices, or configurations and may employ any type, form, and combination of data storage media and/or device. For example, storage device 1206 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1206. For example, data representative of one or more executable applications 1212 (which may include, but are not limited to, one or more of the software applications described herein) configured to direct processor 1204 to perform any of the operations described herein may be stored within storage device 1206. In some examples, data may be arranged in one or more databases residing within storage device 1206.

I/O module 1208 may be configured to receive user input and provide user output and may include any hardware, firmware, software, or combination thereof supportive of input and output capabilities. For example, I/O module 1208 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1208 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1208 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing device 1200. For example, one or more applications 1212 residing within storage device 1206 may be configured to direct processor 1204 to perform one or more processes or functions associated with delivery facility 102, detection facility 104, application management facility 106, stream management facility 902, application management facility 094, presentation facility 906, and/or detection facility 908. Likewise, storage facility 108 and/or storage facility 910 may be implemented by or within storage device 1206.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
   delivering, by a media content presentation system, a primary media content stream to a primary access device, the primary media content stream comprising data representative of a media content instance that is presented by the primary access device as the primary media content stream is delivered to the primary access device and data representative of an executable application related to the media content instance;
   determining, by the media content presentation system, that a secondary access device associated with a user is located within a detection zone associated with the primary access device during a time period associated with the presentation of the media content instance by the primary access device;
   directing, by the media content presentation system, the primary access device to generate a version of the executable application that is personalized for the user of the secondary access device, and
   directing, by the media content presentation system, the primary access device to deliver the version of the executable application that is personalized for the user to the secondary access device via an additional media content stream for execution by the secondary access device during the presentation of the media content instance.

2. The method of claim 1, wherein the directing of the primary access device to generate and deliver the personalized version of the executable application to the secondary access device is performed in accordance with a course correction heuristic.

3. The method of claim 1, wherein the data representative of the executable application comprises a link to a remote computing device that maintains the executable application.

4. The method of claim 1, wherein the data representative of the executable application comprises one or more data files that constitute the executable application.

5. The method of claim 1, further comprising:
    determining, by the media content presentation system, that an additional secondary access device associated with an additional user is located within the detection zone during the time period associated with the presentation of the media content instance by the primary access device; and
    directing, by the media content presentation system, the primary access device to generate and deliver an additional version of the executable application that is personalized for the additional user to the additional secondary access device for execution by the additional secondary access device during the presentation of the media content instance by the primary access device.

6. The method of claim 5, wherein the personalized version of the executable application is different than the additional personalized version of the executable application.

7. The method of claim 1, wherein the determining that the secondary access device is located within the detection zone comprises detecting that the secondary access device is connected to a local area network of which the primary access device is a part.

8. The method of claim 1, wherein the determining that the secondary access device is located within the detection zone comprises detecting that the secondary access device is located within a predetermined distance of at least one of the primary access device, a display screen associated with the primary access device, and a detection device associated with the primary access device.

9. The method of claim 1, wherein
    the data representative of the executable application comprises data representative of a plurality of different versions of the executable application; and
    the directing of the primary access device to generate and deliver the personalized version of the executable application to the secondary access device comprises directing the primary access device to
        select a particular version of the executable application from the plurality of different versions of the executable application, and
        provide the selected version of the executable application to the secondary access device via the additional media content stream.

10. The method of claim 1, wherein the directing of the primary access device to generate and deliver the personalized version of the executable application to the secondary access device comprises:
    directing the primary access device to modify the executable application, and
    deliver the modified executable application to the secondary access device via the additional media content stream.

11. The method of claim 1, wherein the directing of the primary access device to generate the personalized version of the executable application is performed in accordance with a user profile associated with the user.

12. The method of claim 1, wherein the directing of the primary access device to generate the personalized version of the executable application comprises:
    analyzing an operation history descriptive of one or more operations performed by the secondary access device prior to the presentation of the media content instance; and
    directing the primary access device to generate the personalized version of the executable application based on the operation history.

13. The method of claim 1, wherein the directing of the primary access device to generate the personalized version of the executable application comprises:
    detecting an ambient action performed by at least one of the user and one or more other users within the detection zone; and
    directing the primary access device to generate the personalized version of the executable application based on the detected ambient action.

14. The method of claim 1, wherein the directing of the primary access device to generate the personalized version of the executable application comprises:
    detecting a presence of an inanimate physical object within the detection zone; and
    directing the primary access device to generate the personalized version of the executable application based on the detected inanimate physical object.

15. The method of claim 1, wherein the directing of the primary access device to generate the personalized version of the executable application comprises:
    detecting a sharing of another executable application with the user by another user prior to the presentation of the media content instance by way of the primary access device; and
    directing the primary access device to generate the personalized version of the executable application based on the shared executable application.

16. The method of claim 1, wherein the directing of the primary access device to generate the personalized version of the executable application comprises:
    detecting an interaction by the user with the media content instance; and
    directing the primary access device to generate the personalized version of the executable application based on the detected interaction.

17. The method of claim 1, further comprising:
    detecting, by the media content presentation system, a request provided by the user to purchase access to the personalized version of the application; and
    performing the directing of the primary access device to generate and deliver the personalized version of the executable application to the secondary access device via the additional media content stream in response to the request.

18. The method of claim 1, further comprising presenting, by the media content presentation system by way of the primary access device, a notification of an availability of the personalized version of the executable application.

19. The method of claim 1, wherein the directing of the primary access device to deliver the personalized version of the executable application to the secondary access device comprises directing the primary access device to insert data representative of the personalized version of the executable application into the additional media content stream.

20. The method of claim 1, embodied as computer-executable instructions on at least one non-transitory computer-readable medium.

21. A method comprising:
    delivering, by a media content presentation system, a primary media content stream to a primary access device, the primary media content stream comprising data representative of a media content instance that is presented by the primary access device as the primary media content stream is delivered to the primary access device;
    determining, by the media content presentation system, that a secondary access device associated with a user is located within a detection zone associated with the primary access device during a time period associated with the presentation of the media content instance by the primary access device;

generating, by the media content presentation system in response to the determining, a personalized version of an executable application related to the media content instance and for the user;

delivering, the media content presentation system, the personalized version of the executable application to the primary access device by inserting the personalized version of the executable application into the primary media content stream; and directing, by the media content presentation system, the primary access device to deliver the personalized version of the executable application to the secondary access device via an additional media content stream for execution by the secondary access device during the presentation of the media content instance.

22. A method comprising:

delivering, by a media content presentation system, a primary media content stream to a primary access device, the primary media content stream comprising data representative of a media content instance that is presented by the primary access device as the primary media content stream is delivered to the primary access device;

determining, by the media content presentation system, that a secondary access device associated with a user is located within a detection zone associated with the primary access device during a time period associated with the presentation of the media content instance by the primary access device;

generating, by the media content presentation system in response to the determining, a personalized version of an executable application related to the media content instance and for the user; and delivering, by the media content presentation system, the personalized version of the executable application to the secondary access device for execution by the secondary access device during the presentation of the media content instance by inserting the personalized version of the executable application into a secondary media content stream being delivered to the secondary access device.

23. A method comprising:

receiving, by a primary access device, a primary media content stream from a media content provider subsystem, the primary media content stream comprising data representative of a media content instance and data representative of an executable application related to the media content instance;

storing, by the primary access device based on the data representative of the executable application, the executable application;

presenting, by the primary access device, the media content instance;

determining, by the primary access device, that a secondary access device associated with a user is located within a detection zone associated with the primary access device during a time period associated with the presenting of the media content instance by the primary access device;

generating, by the primary access device in response to the determining, a version of the executable application that is personalized for the user; and delivering, by the primary access device, the personalized version of the executable application to the secondary access device via an additional media content stream for execution by the secondary access device during the presentation of the media content instance.

24. The method of claim 23, wherein:

the data representative of the executable application comprises a link to a remote computing device that maintains the executable application; and the storing of the data representative of the executable application comprises
using the link to connect to the remote computing device, and
downloading the executable application from the remote computing device.

25. A system comprising:

a delivery facility configured to deliver a primary media content stream to a primary access device, the primary media content stream comprising data representative of a media content instance that is presented by the primary access device as the primary media content stream is delivered to the primary access device and data representative of an executable application related to the media content instance;

a detection facility communicatively coupled to the delivery facility and configured to determine that a secondary access device associated with a user is located within a detection zone associated with the primary access device during a time period associated with the presentation of the media content instance by the primary access device; and an application management facility communicatively coupled to the detection facility and configured to direct the primary access device to
generate a version of the executable application that is personalized for the user of the secondary access device, and
deliver the version of the executable application that is personalized for the user to the secondary access device via an additional media content stream for execution by the secondary access device during the presentation of the media content instance.

* * * * *